US011403212B1

(12) United States Patent
Singha et al.

(10) Patent No.: US 11,403,212 B1
(45) Date of Patent: Aug. 2, 2022

(54) DEDUPLICATION ASSISTED CACHING POLICY FOR CONTENT BASED READ CACHE (CBRC)

(71) Applicant: VMware, Inc., Palo Alto, CA (US)

(72) Inventors: Zubraj Singha, Bangalore (IN); Kashish Bhatia, Bangalore (IN); Tanay Ganguly, Bangalore (IN); Goresh Musalay, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/308,827

(22) Filed: May 5, 2021

(51) Int. Cl.
G06F 12/02 (2006.01)
G06F 12/0875 (2016.01)
G06F 12/123 (2016.01)

(52) U.S. Cl.
CPC ........ *G06F 12/023* (2013.01); *G06F 12/0875* (2013.01); *G06F 12/124* (2013.01); *G06F 2212/1044* (2013.01)

(58) Field of Classification Search
CPC .. G06F 12/023; G06F 12/0875; G06F 12/124; G06F 2212/1044
See application file for complete search history.

(56) References Cited

U.S. PATENT DOCUMENTS

| 8,732,403 | B1 * | 5/2014 | Nayak | G06F 3/0619 |
| | | | | 711/170 |
| 8,751,763 | B1 * | 6/2014 | Ramarao | G06F 16/1752 |
| | | | | 711/162 |
| 9,116,812 | B2 * | 8/2015 | Joshi | G06F 9/4406 |
| 9,141,554 | B1 * | 9/2015 | Candelaria | G06F 3/0673 |
| 9,235,588 | B1 * | 1/2016 | Vaikar | G06F 3/0685 |
| 2013/0097380 | A1 * | 4/2013 | Colgrove | G06F 3/0641 |
| | | | | 711/E12.017 |
| 2014/0115258 | A1 * | 4/2014 | Week | G06F 16/1752 |
| | | | | 711/163 |
| 2019/0227941 | A1 * | 7/2019 | Chang | G06F 3/0673 |

* cited by examiner

Primary Examiner — William E. Baughman
(74) Attorney, Agent, or Firm — Patterson + Sheridan, LLP (57) ABSTRACT The disclosure provides an approach for implementing a deduplicated (DD) assisted caching policy for a content based read cache (CBRC). Embodiments include receiving a first input/output (I/O) to write first data in storage as associated with a first logical block address (LBA); when the first data is located in a CBRC or in a DD cache located in memory, incrementing a first deduplication counter associated with the first data; when the first data is located in neither the CBRC nor the DD cache, creating the first deduplication counter; when the first deduplication counter meets a threshold after incrementing, and the first data is not located in the DD cache, adding the first data to the DD cache; and writing the first data to the storage as associated with the first LBA.

20 Claims, 5 Drawing Sheets

DEDUPLICATION ASSISTED CACHING POLICY FOR CONTENT BASED READ CACHE (CBRC)

BACKGROUND

Virtualized computing systems provide efficiency and flexibility for system operators by enabling computing resources to be deployed and managed as needed to accommodate specific applications and capacity requirements. As virtualized computing systems mature and achieve broad market acceptance, demand continues for increased performance of virtual endpoints and increased overall system efficiency.

A virtualized computing system involves multiple hosts in communication over a physical network infrastructure. Each host has one or more virtualized endpoints such as virtual machines (VMs), containers, or other virtual computing instances (VCIs). The virtualized endpoints can be connected to logical overlay networks. A logical overlay network may span multiple hosts and is decoupled from the underlying physical network infrastructure.

Hosts are configured to provide a virtualization layer, also referred to as a hypervisor. The virtualization layer abstracts processor, memory, storage, and networking resources into multiple virtual endpoints that run concurrently on the same host. Each VM may be configured to store and retrieve file system data within a corresponding storage system. Relatively slow access latencies associated with storage, such as hard disk drives implementing the storage system, give rise to a bottleneck in file system performance, reducing overall system performance.

A cache may be stored in physical memory (e.g., random access memory (RAM)) configured within a host. The cache acts as a small, fast memory that stores recently accessed data items and can be used to satisfy data requests without accessing the storage. Accordingly, data requests satisfied by the cache are executed with less latency as the latency associated with accessing the storage is avoided. Caches can improve performance by exploiting data reference locality. Data reference locality exists when data accesses tend to be near each other in time and/or space. Two types of data reference locality include temporal and spatial. A data item exhibits temporal locality if it is repeatedly accessed within a short period of time. Caches may exploit temporal locality by storing recently accessed data.

Caches may be limited in size compared to the overall storage capacity available within the storage system, and therefore may only be able to cache a limited amount of data. Cache management systems may implement caching policies defining rules that are used to determine what data is cached, including when data is added to the cache and when data is evicted from the cache. Caching policies may be designed to increase a cache hit ratio, a measurement of how many content requests a cache is able to fulfill successfully compared to how many requests it receives. While achieving a maximum cache hit ratio (i.e., a one-hundred percent ratio) may be unattainable in many cases, a well-designed cache policy may suitably provide a good number of caching hits with respect to the layer (e.g., storage system) on top of which the caching policy is implemented.

SUMMARY

Embodiments provide a method for implementing a deduplicated (DD) assisted caching policy for a content based read cache (CBRC).

Embodiments include receiving a first input/output (I/O) to write first data in storage as associated with a first logical block address (LBA); when the first data is located in a CBRC or in a DD cache located in memory, incrementing a first deduplication counter associated with the first data; when the first data is located in neither the CBRC nor the DD cache, creating the first deduplication counter; when the first deduplication counter meets a threshold after incrementing, and the first data is not located in the DD cache, adding the first data to the DD cache; and writing the first data to the storage as associated with the first LBA.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for implementing a deduplicated (DD) assisted caching policy for a content based read cache (CBRC). A CBRC caches data such that the key used to retrieve data stored in the CBRC is based on a function of the data itself, and not a block address associated with the data. In particular, a hash of the data is stored as a key used to retrieve the actual data associated with the hash. Therefore, regardless of the block address indicated in an input/output request (I/O), such as a read I/O, the read I/O can be serviced from the CBRC, instead of storage, if the data associated with the block address is in the CBRC, as discussed further herein. For example, particular data may be the same for multiple block addresses, and therefore any read I/O that references any such block address may be serviced from CBRC when it stores the particular data.

Accordingly, one host-based, random access memory (RAM) based caching solution may include a CBRC designed to help reduce read I/Os issued to the storage system and thus improve scalability of the storage system while being completely transparent to a guest operating system (OS). CBRC may implement a replacement policy referred to as a least recently used (LRU) policy that defines eviction logic of the cache. LRU is a cache eviction strategy, wherein if the cache size has reached the maximum allocated capacity, the least recently accessed objects in the cache will be evicted. In other words, CBRC LRU policies predict that recently used data may be accessed again; however, there is no guarantee that this data may be accessed at another time. Thus, CBRC LRU policies may prove to be ineffective, specifically in environments experiencing randomized workloads.

Existing caching policies may be improved, especially for environments where underlying data committed on the disk is regularly deduplicated data (e.g., data deduplication is a technique for eliminating duplicated or redundant data). Accordingly, a second caching policy, specifically, a deduplication (DD) policy, may be introduced to assist performance of CBRC. This assisting caching policy may help to improve cache effectiveness by ensuring that highly duplicated data in workloads with duplicated data has a high chance of getting read from the cache. A DD policy may improve data reference locality of the cache.

Figure 1:
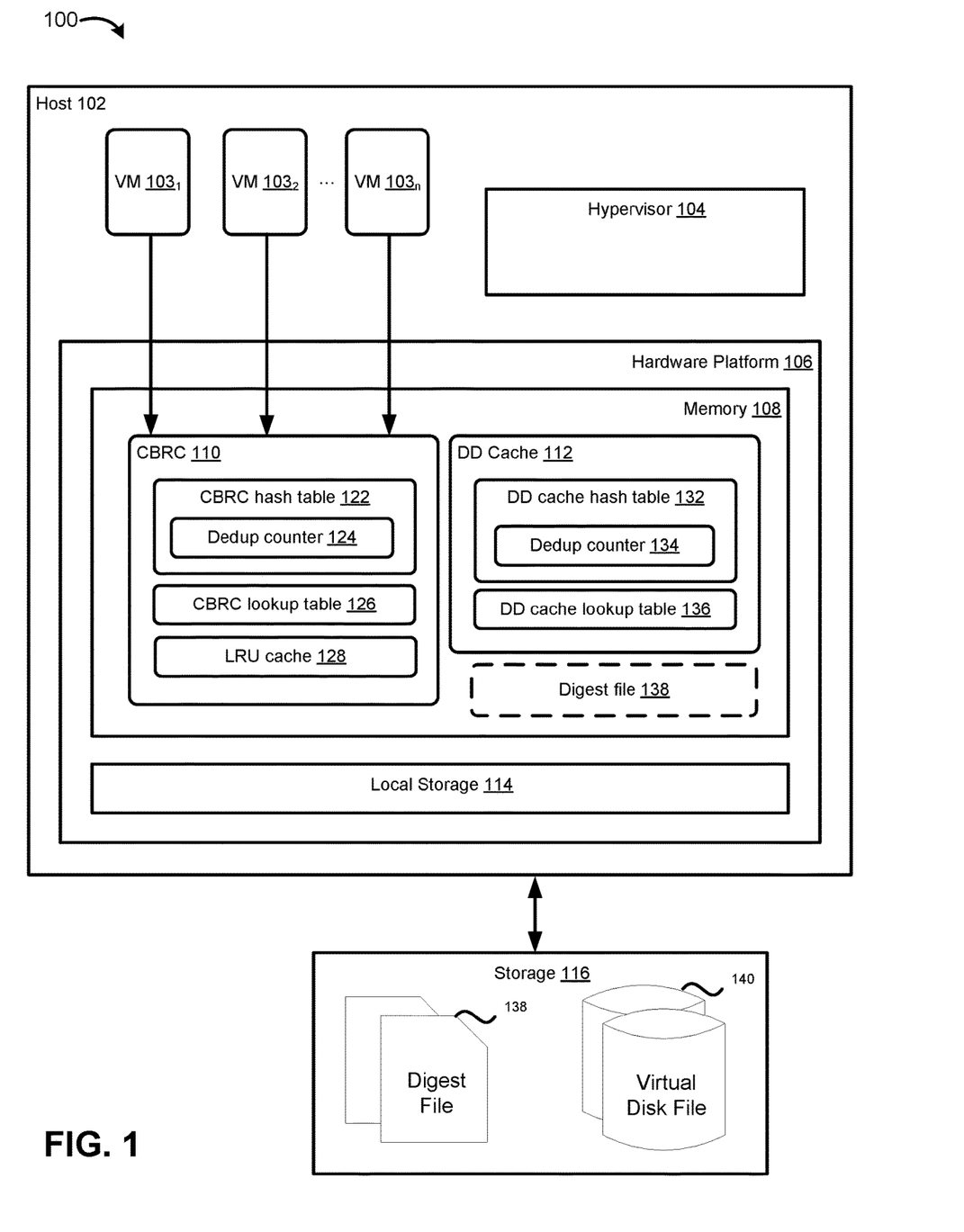
FIG. 1 depicts a host computing system in accordance with embodiments of the present disclosure.

FIG. 1 depicts a host computing system 100 in accordance with embodiments of the present disclosure. Host computing system 100 is representative of a virtualized computer architecture. As shown, host computing system 100 includes a host 102 and storage 116.

Host 102 may be constructed on a server grade hardware platform 106, such as an x86 architecture platform. Host 102 is configured to provide a virtualization layer, also referred to as a hypervisor 104, that abstracts processor, memory, storage, and networking resources of hardware platform 106 into multiple virtual machines (VMs) $103_1$ to $103_n$. (collectively referred to as VMs 103 and individually referred to as VM 103) that run concurrently on the same host 102. Though certain techniques herein are discussed with respect to VMs, they may similarly be applicable to other suitable virtual computing instances (VCIs), such as containers, virtual appliances, and/or the like.

Storage 116 provides VMs access to consolidated, block-level data storage. In one embodiment, storage 116 is a virtual storage area network (vSAN) that aggregates local or direct-attached capacity devices of a host cluster and creates a single storage pool shared across all hosts in the cluster. In another embodiment, storage 116 is storage directly coupled to host 102. In another embodiment, storage 116 includes local storage 114 in hardware platform 106.

Storage 116 manages storage of data at a block granularity. For example, storage 116 is divided into a number of physical blocks (e.g., 4096 bytes or "4K" size blocks), each physical block having a corresponding physical block address that indexes the physical block in storage. The physical blocks of storage 116 are used to store blocks of data (also referred to as data blocks) used by VMs 103, which may be referenced by logical block addresses (LBAs), as discussed herein. Each block of data may have an uncompressed size corresponding to a physical block. Blocks of data may be stored as compressed data or uncompressed data in storage 116, such that there may or may not be a one to one correspondence between a physical block on storage 116 and a data block referenced by a logical block address.

Storage 116 receives I/O requests for a data block from a VM, which the VM refers to using a guest LBA that is in an address space used by the VM to address blocks of data. Such an LBA may be referred to as an LBA of the data block. Different VMs may use the same LBA to refer to different data blocks, as the LBA is specific to the VM.

Storage 116 stores the data block in a physical block. The physical block where the data block is stored is referred to as a physical block of the data block. The physical block of the data block is addressed by a physical block address (PBA) corresponding to the physical block. One or more mapping tables may be used to map the relationship between an LBA and its corresponding PBA, as is known in the art.

One or more virtual disks backed by virtual disk files 140 stored in storage 116 each has a separate associated digest file 138 stored in storage 116. The digest file 138 is a cryptographical representation of the virtual disk and stores metadata about each data block of the virtual disk 140. In particular, for each such data block, a corresponding unique hash of the data (also referred to as content) of the data block is generated, for example by using a cryptographic hashing algorithm such as the SHA-1 algorithm, and the hash is stored in the digest file. The digest file 138 maintains a mapping of each block address (e.g., LBA) of each data block in the virtual disk to a corresponding hash. For example, the digest file 138 stores tuples of <LBA, hash of data referenced by the LBA, validity bit>, where the LBA is the key. The validity bit indicates whether the particular LBA is "valid" or "invalid." An LBA is valid if there is actual data stored in virtual disk file 140/storage 116 that is addressed by the LBA. An LBA is invalid if there is no data stored in virtual disk file 140/storage 116 that is addressed by the LBA (e.g., due to deletion, initialization, etc.).

Hypervisor 104 runs in conjunction with an OS (not shown) in host 102. Hypervisor 104 can be installed as system level software directly on hardware platform 106 of host 102 (often referred to as "bare metal" installation) and be conceptually interposed between the physical hardware and the guest OSs executing in the VMs 103.

Hardware platform 106 of host 102 includes physical resources of a computing device, such as a memory 108 and local storage 114. Hardware platform 106 may include other physical resources of a computing devices, not shown in FIG. 1, such as one or multiple processor(s), accelerator(s), a disk interface, and/or a network interface. As discussed, physical resources of host 102 can be abstracted into a number of VMs 103 by hypervisor 106, such that the physical resources of the host 102 may be shared by VMs 103 residing on host 102.

Local storage 114 may include one or more hard disks, flash memory modules, solid state disks, and/or optical disks. Memory 108 may include, for example, one or more RAM modules. Memory 108 contains a CBRC 110 and a DD cache 112, such as in one or more reserved memory spaces. Memory 108 also contains an in-memory copy of a digest file 138, described herein. For example, when a VM 103 is powered on, the digest file(s) 138 associated with the virtual disk(s) 140 of the VM 103 may be loaded into memory 108 such that there is an in-memory copy of the digest file(s) 138 accessible, thereby avoiding I/O to storage 116.

CBRC 110 is generally a cache for data (e.g., corresponding to contents of data blocks of virtual disks backed by virtual disk files) accessed by VMs 103. CBRC 110 may be implemented as a virtual small computer system interface (vSCSI) that maintains a global cache on host 102 to serve read I/O requests for VMs 103. Data stored in CBRC 110 is not tied to any particular VM 103 and may be shared across VMs 103 on host 102, thus, this implementation allows for the detection of duplicate content of data blocks across VMs 103 running on host 102, as well as the servicing of I/Os across VMs 103 running on host 102 from CBRC 110.

As shown, CBRC 110 includes LRU cache 128, which stores data for CBRC 110 that are indexed by CBRC lookup table 126. LRU is a cache eviction strategy, wherein if the cache size has reached the maximum allocated capacity. the least recently accessed object(s) in the cache will be evicted from the cache. Data in CBRC LRU cache 128 are maintained in LRU order. CBRC 110 manages the LRU cache 128 by monitoring capacity of the LRU 128 when accommodating new data corresponding to blocks of data in CBRC LRU cache 128. When capacity is reached, CBRC 110 evicts least recently accessed data first.

CBRC 110 further includes CBRC lookup table 126. CBRC lookup table 126 indexes the data stored in LRU cache 128 by hashes of data. For example, CBRC lookup table 126 stores tuples of <hash of data, memory location of data>, where the hash is the key. Thus, given a hash of data, the CBRC lookup table 126 can be used to determine if the data is stored in LRU cache 128, and if so, the location of the data such that it can be retrieved from LRU cache 128.

For example, if a read I/O indicating an LBA of a virtual disk file 140 is received from a VM 103, the digest file 138 (e.g., in-memory copy) of the virtual disk file 140 can be used to retrieve a hash of the data of a data block stored in storage 116 as associated with the LBA. The hash of the data is used to search the CBRC lookup table 126 to determine if there is a matching hash, such that the read I/O can be serviced from the CBRC 110, instead of issuing the read I/O to the virtual disk file 140 in storage 116. It should be noted that hashes of data stored in digest file 138, CBRC lookup table 126, and other data structures discussed herein are consistent such that for a given data, the same hash is stored in each data structure. For example, the hashes are generated using a same hashing algorithm for each data structure.

As will be understood from the functionality of CBRC 110 discussed herein, the data stored in CBRC 110 can be deduplicated, meaning that a given data is stored only once in CBRC 110, regardless of the number of LBAs for which I/Os are received that are associated with the given data. This helps to reduce the amount of memory needed to implement CBRC 110.

Based on the concept that CBRC 110 includes "deduplicated" data, a second caching policy may be introduced to assist performance of CBRC 110 by, for example, improving data reference locality of the cache. There are two types of data reference locality—temporal and spatial. A data item exhibits temporal locality if it is repeatedly accessed within a short period of time. Spatial locality implies that data items stored in adjacent memory locations are likely to be accessed contemporaneously. LRU policy of CBRC 110 may exploit temporal locality, while the second caching policy may exploit spatial locality.

According to embodiments of the present disclosure, the LRU policy of CBRC 110 may be supplemented by the addition of a deduplicated (DD) cache. As shown in FIG. 1, memory 108 includes a DD cache 112, in addition to CBRC 110. DD cache 112 maintains highly deduplicated data. DD cache 112 increases effectiveness of the caching system by ensuring that highly deduplicated data is not evicted from the cache. Highly deduplicated data corresponds to given data referenced by multiple LBAs, across VMs 103 and/or for a given VM 103, for which I/Os have been handled. The greater the number of LBAs referencing the same data, the greater the level of deduplication. Implementation of a DD assisted caching policy for CBRC may provide substantial benefit, in terms of improving temporal and spatial locality of the cache. DD cache 112 may provide significant benefit in environments with workloads involving multiple, similar I/Os for different VMs 103.

The DD cache 112 may link to highly deduplicated data in CBRC 110, such that when the highly deduplicated data is evicted from the LRU cache 128 of CBRC 110 based on the LRU policy, the highly deduplicated data can remain in the DD cache 112.

In order to implement the second caching policy and use DD cache 112 to supplement CBRC 110, CBRC 110 further includes a CBRC hash table 122. CBRC hash table 122 maintains a mapping of hashes of data to a deduplication (dedup) counter 124 for the data. For example, CBRC hash table 122 stores tuples of <hash of data, dedup counter>, where the hash is the key. The dedup counter 124 indicates an amount of deduplication associated with a particular data.

As shown, DD cache 112 also includes a DD cache hash table 132. DD cache hash table 132 contains a mapping of hashes of data to a dedup counter 134 for the data. When highly deduplicated data is evicted from LRU cache 128, the dedup count for the associated dedup counter 124 can be transferred to the DD cache hash table 132 as dedup counter 134.

The dedup counter may maintain a record of the number of different LBAs that reference the same data. For example, the dedup counter for a given data (e.g., corresponding to the content of one or more data blocks) is incremented each time a unique write I/O is issued for the data (e.g., from the same VM 103 or among different VMs 103). A write I/O for the given data is considered a unique write I/O for the given data, where the LBA associated with the write I/O does not have valid data associated with the LBA, such as indicated in the digest file 138. A write I/O may also be considered a unique write I/O for the given data, where the associated LBA has valid previously stored data associated with the LBA, and that previously stored data is different than the given data indicated in the write I/O. Further, the dedup counter for a given data may be decremented each time a write I/O is issued that overwrites that content with different content. For example, if a write I/O is issued for an LBA, where the associated LBA has valid previously stored data associated with the LBA, and that previously stored data is different than the given data indicated in the write I/O, a dedup counter, if it exists, for the previously stored is decremented. Therefore, the dedup counter maintains a record of the number of LBAs that reference the same data.

In an illustrative example of a write request in the host computing system 100, a first write request I/O requests to write first data, D1, for a first LBA, LBA1, in virtual disk file 140 in storage 116, and the corresponding hash, H1, is calculated for D1.

Where the in-memory digest file 138 has an invalid bit value for LBA1 of the write request, the write corresponds to a new write. For a new write, D1 is written to the physical block corresponding to LBA1 and the in-memory digest file 138 is updated to include the tuple of <LBA1, H1, valid>, indicating the LBA1 is associated with H1, and LBA1 is now valid. CBRC 110 (and in some cases DD cache 112) is then checked for matching content D1 using H1. For example, the CBRC hash table 122 (and DD cache hash table 132, if not found in the CBRC 110), containing the key-value pairs of hashes and deduplication counters corresponding to cached data, is checked for H1.

If H1 is not found in CBRC 110 or DD cache 112, D1 is added to LRU cache 128 at a memory location, H1 and the memory location are added to the CBRC lookup table 126, a first dedup counter is created and initialized at "1" for H1, the key-value pair of H1 and the dedup counter 124 value (1) are stored in the CBRC hash table 122, and H1 is moved to the top of the CBRC LRU policy.

On the other hand, if H1 found in CBRC 110 (or in some cases DD cache 112), then the existing first dedup counter for H1 is incremented, and H1 is moved to the top of the CBRC LRU policy. Further, where H1 is found in DD cache 112 and not CBRC 110, D1 may be moved to CBRC 110, as discussed herein.

Still referring to the above illustrative example, where the in-memory digest file 138 has a valid bit for LBA1 of the write request, the write corresponds to an overwrite—meaning that previous data, D, has previously been written as associated with LBA1. D1 indicated in the write I/O may be the same data as D (e.g., second data stored in storage for the first LBA prior to the first write I/O (first I/O)), or may be different data than D. The in-memory digest file 138 is checked to determine whether the hash, H, for D is the same as H1.

In the case that H is different than H1, the CBRC hash table 122 (and DD cache hash table 132) can be searched for H and, if present, the dedup counter for H is decremented. Further, in the case H is different than H1, the CBRC hash table 122 (and DD cache hash table 132) is also checked for H1. If H1 is not found in the CBRC hash table 122 (and DD cache hash table 132), then D1 is added to LRU cache 128 at a memory location, H1 and the memory location are added to the CBRC lookup table 126, a first dedup counter is created and initialized at "1" for H1, the key-value pair of H1 and the first dedup counter value (1) are stored in the CBRC hash table 122, and H1 is moved to the top of the LRU policy.

In the case that H is different than H1, and H1 is found in the CBRC hash table 122 (or DD cache hash table 132), then the existing first dedup counter for H1 is incremented, updated in the CBRC hash table 122, and H1 is moved to the top of the CBRC LRU policy. Further, where H1 is found in DD cache 112 and not CBRC 110, D1 may be moved to CBRC 110, as discussed herein.

On the other hand, in the case that H=H1 (e.g., first data is the same as second data stored in storage for the first LBA prior to the first I/O), then the dedup counter for H/H1 is neither incremented nor decremented.

Maintaining dedup counter 124 and dedup counter 134 helps to ensure that highly duplicated data (belonging to the same or different virtual disks) has a high chance of getting read from the cache. Implementing dedup counter(s) in CBRC 110 may improve the cache hit ratio thereby improving overall effectiveness of the caching system.

As an illustrative example of a read request in the host computing system 100, a second I/O requesting to read second data, D2, for a second LBA, LBA2, may have higher chances of being read from the cache when D2 is highly duplicated data and a DD caching policy is implemented to assist an LRU policy of the CBRC 110. In such a case, a hash (H2) of D2 may be retrieved from the in-memory digest file 138 for LBA2. The retrieved hash H2 for D2 may be used to find a memory location of D2 in CBRC 110 using CBRC lookup table 126. If H2 is found in CBRC lookup table 126, D2 may be retrieved from the CBRC 110. If H2 is not found in CBRC lookup table 126, H2 may be used to find a memory location of D2 in DD cache 112 using DD cache lookup table 136. If H2 is found in DD cache lookup table 136, D2 may be retrieved from the DD cache 112. When H2 is located in DD cache 112, metadata associated with D2 may be moved to CBRC 110, and removed from DD cache 112, accordingly. If H2 is not found in CBRC lookup table 126 or DD cache lookup table 136, D2 may be retrieved from the virtual disk file 140 in storage 116.

Though certain aspects herein describe I/Os with respect to blocks, they may similarly be applicable to I/Os for pages, where a page comprises multiple blocks.

Figure 2A:
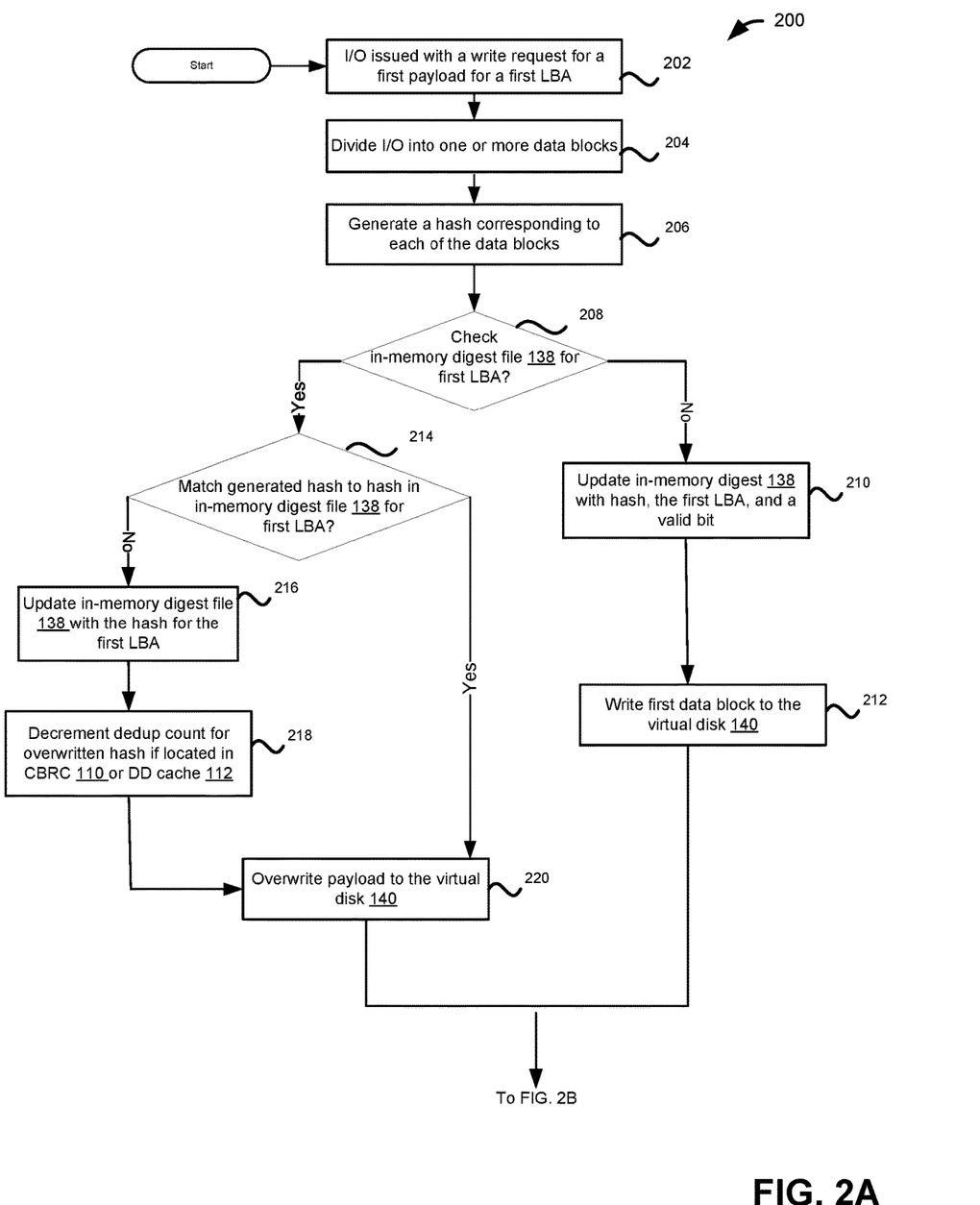
FIGS. 2A and 2B depict an example workflow for processing a write request according to a deduplicated (DD) assisted caching policy in accordance with embodiments of the present disclosure.
Figure 2B:
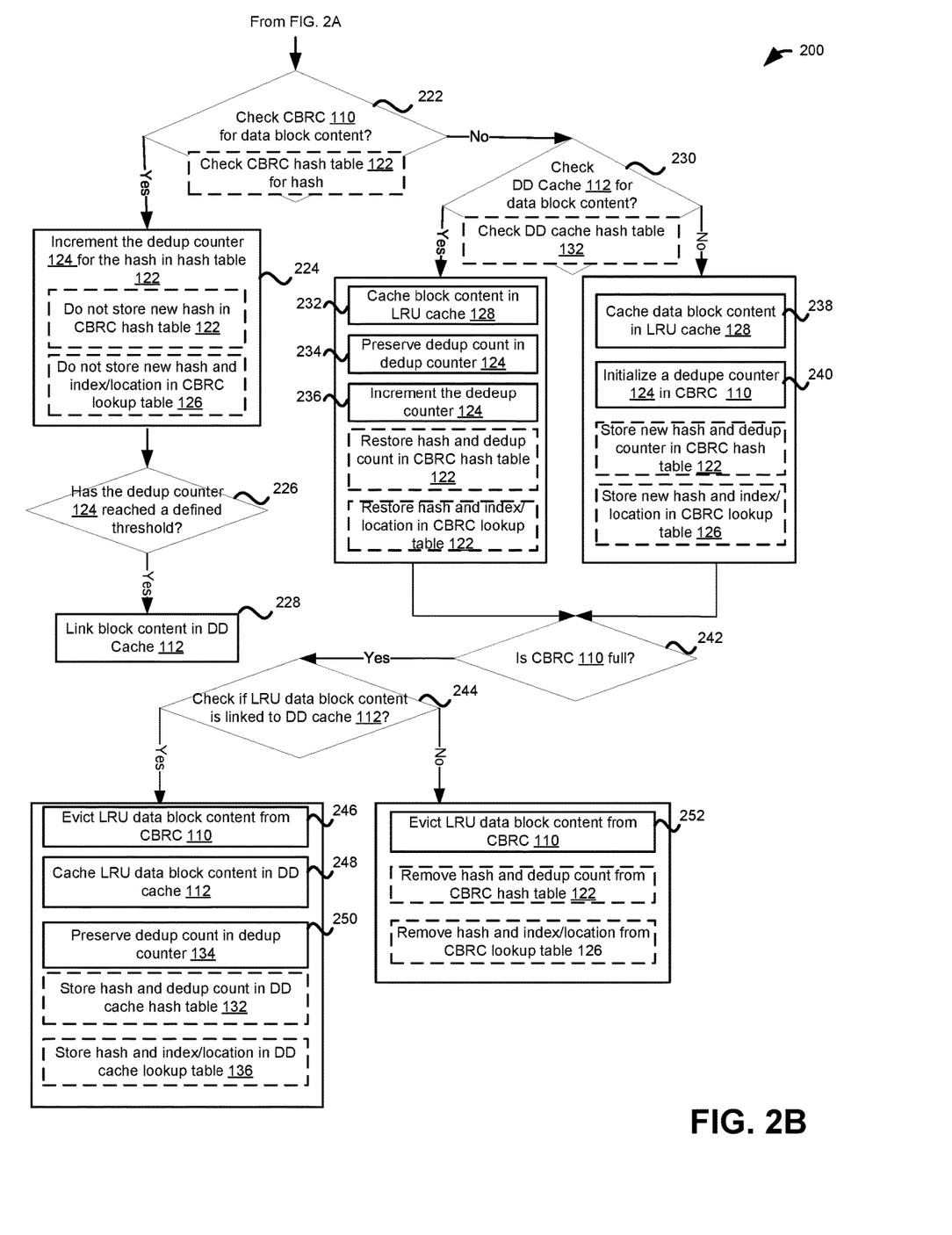

FIGS. 2A and 2B depict an example workflow 200 for processing a write request according to a DD assisted caching policy, in accordance with embodiments of the present disclosure. The workflow 200 of FIGS. 2A and 2B may begin, at 202, by a VM 103 in host 102 issuing an I/O with a write request for a first payload. At 204, the first payload may be divided into blocks of data, each block of data corresponding to the size of a physical block of storage (e.g., 4096 bytes or "4K" size blocks). Each block of data may be referenced by an LBA. At 206, a corresponding unique hash may be generated for each block of data, for example by using a cryptographic hashing algorithm. For example, a first hash may be generated for a first data block referenced by a first LBA (among the blocks of data). While steps 208-252 of workflow 200 are described with respect to a single block of data (e.g., a first block of data), where the payload is divided into multiple data blocks, each block may be handled separately (through steps 208-252 of workflow 200) in servicing the write request for each block of data.

At 208, the in-memory digest file 138 may be used to determine whether the write is for a new write of data for the first LBA (e.g., first LBA is "not valid" or has an invalid bit value) or corresponds to an overwrite of data referenced by the first LBA (e.g., first LBA is "valid" or has a valid bit value). In other words, the first LBA is compared against LBAs stored in the in-memory digest file 138 where the in-memory digest file 138 provides a mapping between each LBA of each block of data to a corresponding hash and a valid or invalid bit value of the validity bit.

Where the in-memory digest file 138 has an invalid bit value for the first LBA of the write request, the write corresponds to a new write. For a new write, at 210, the in-memory digest file 138 is updated to include the tuple of <first LBA, first hash, valid>, indicating the first LBA is associated with the first hash, and the first LBA is now valid. At 212, the data block referenced by the first LBA is written to the virtual disk at a location associated with the LBA (e.g., is written storage 116, which may be performed asynchronously at another time).

Returning to 208, where the in-memory digest file 138 has a valid bit for the first LBA of the write request, the write corresponds to an overwrite. The first LBA and a corresponding hash was previously stored in the in-memory digest file 138. Accordingly, at 214, the in-memory digest file 138 is checked to determine whether the generated first hash, for the requested first data block content, matches the hash previously associated with the first LBA.

At 214, where the generated first hash does not match the hash previously associated with the first LBA in the in-memory digest file 138, the write corresponds to an overwrite of new data. At 216, the in-memory digest file 138 is updated to remove the hash previously associated with the first LBA and in its place, associate the first hash (corresponding to the requested first data block content) with the first LBA such that the in-memory digest file is updated to the tuple of <first LBA, first hash, valid>. As described herein, CBRC hash table 122 (and DD cache hash table 122) stores tuples of <hash of a block of data, dedup counter>, where the hash is the key. Therefore, CBRC hash table 122 (and DD cache hash table 132) is searched for the overwritten hash (e.g., old hash associated with the first LBA) to locate a dedup counter corresponding to the overwritten hash. At 218, if the overwritten hash is located in CBRC hash table 122 (or DD cache hash table 132), the corresponding dedup counter is decremented for the overwritten hash. At 220, the first data block is written to the virtual disk 140 at a location associated with the LBA (e.g., is written storage 116, which may be performed asynchronously at another time). For example, physical block(s) corresponding to the first LBA in the virtual disk are overwritten with the first data block referenced by the first LBA, where the first data block content is different than content previously written to that LBA.

Returning to 214, where the generated first hash does match the hash previously associated with the first LBA in the in-memory digest file 138, the write corresponds to an overwrite of old data. While FIG. 2A illustrates that a dedup counter associated with the overwritten hash may not need to decremented, according to some other implementations, a dedup counter associated with the overwritten hash may be located in CBRC hash table 122 (or DD cache hash table 132) and decremented accordingly. At 220, the first data block is written to the virtual disk 140 at a location associated with the LBA (e.g., is written storage 116, which may be performed asynchronously at another time). For example, physical block(s) corresponding to the first LBA in the virtual disk are overwritten with the first data block referenced by the first LBA, where the first data block content is identical to content previously written to that LBA.

Irrespective of whether the write corresponds to a new write of data, an overwrite of new data, or an overwrite of old data previously written to the first LBA, the first data block content requested may be checked against the cache (CBRC 110 and DD cache 112) to determine whether the cache contains identical content. While the new write at 212 and overwrite at 220 are shown in the figure as occurring before checking the cache, it should be understood that the write to the disk may be performed asynchronously and could occur at a different point in the workflow.

At 222 (in FIG. 2B), the content of the first data block referenced by the first LBA may initially be checked against CBRC 110 to determine whether CBRC 110 contains identical content. As described herein, CBRC hashes the content of data blocks referenced by an I/O, each of the data blocks of the I/O being referenced by a corresponding LBA. Content stored in CBRC 110 is ambiguous of the VM 103 it belongs to, as well as the virtual disk used to store the data block related to this content.

The generated hash for this first data block is compared to hashes previously stored in the CBRC hash table 122. Hashes previously stored in CBRC hash table 122 are indexes to dedup counters 124 corresponding to data block content stored in CBRC 110. Accordingly, locating a matching hash indicates that content related to this hash has previously been stored in CBRC 110.

A matching hash located in CBRC hash table 122 locates a dedup counter 124 associated with this hash. At 224, if a matching hash is located in CBRC hash table 122, then the dedup counter 124 in CBRC 110, previously created for this hash (e.g., corresponding to this data block content), may be incremented. Incrementing the dedup counter, at 224, may depend on whether the write corresponds to a new write of data for the first LBA, an overwrite with new data for the first LBA, or an overwrite of the same data previously associated with the first LBA as determined at 208 and 214 in FIG. 2A.

Returning to 208 (in FIG. 2A), where the in-memory digest file 138 has an invalid bit for the first LBA of the write request, the write corresponds to a new write. An I/O requesting write of new data block content referenced by an LBA may be identical content previously stored in CBRC 110 from a prior I/O requesting a write of the data block content referenced by another LBA. A dedup counter 124 may be incremented, at 224, where the write corresponds to a new write.

Also at 208, where the in-memory digest file 138 has a valid bit for the first LBA of the write request, the write corresponds to an overwrite. A dedup counter 124 may be incremented, at 224, for an overwrite of new data where, at 214, the generated hash does not match the overwritten hash in the in-memory digest file 138. Whether a dedup counter 124 may be incremented for an overwrite of old data may depend on the implementation.

An overwrite of the same data may include a situation where, at 214, the generated first hash, for the requested first data block content, matches a hash previously stored in CBRC hash table 122 and where the previously stored hash is associated with the first LBA. In such a case, two implementations may be considered. In one implementation, no action may be taken with respect to incrementing or decrementing a dedup counter 124 associated with the requested first data block content maintained in CBRC 110. In another implementation, dedup counter 124 maintained in CBRC hash table 122 and corresponding with the hash for the requested first data block content may be incremented (because a matching hash was found in the cache) and decremented (because the previous content was overwritten) such that they cancel each other out and no net change is made to the dedup count of dedup counter 124.

Also at 224, because a hash for this first data block content already exists in CBRC hash table 122, a new hash may not need to be stored in CBRC hash table 122. Similarly, a memory location of the first data block content already exists in CBRC lookup table 126 so it may not be necessary to update this information.

Dedup counter 124 maintains a record of the number of times data block content related to this dedup counter 124 (by its hash) is requested to be written for one or more different LBAs (excluding an I/O requesting overwrite of the same data block content for the same LBA) of VMs 103 accessing the cache. A threshold may be defined for the design of the dedup counter 124. A dedup counter 124 that reaches its defined threshold may indicate to CBRC 110 that data block content associated with this dedup counter 124 (by its hash) may be more likely to be accessed again as compared to other data block content within the cache.

If incrementing dedup counter 124, associated with the data block content, at 226, causes dedup counter 124 to reach its defined threshold amount, then at 228, the data block content is linked to DD cache 112 (e.g., DD cache 112 points to this data block content stored in CBRC 110). DD cache 112 may refer to this data block content stored in CBRC 110. As described in more detail with respect to FIG. 3, to reduce the memory footprint, DD cache 112 may share data block content with CBRC 110 until the data block content is evicted from either of the caches. DD cache 112 pointing to this data block content ensures that even if the content is evicted from CBRC 110 based on an LRU policy of CBRC 110, DD cache 110 may continue to maintain the data block content for servicing I/Os from the cache.

Returning back to 222, if the first data block content is not contained in CBRC 110 (e.g., if a hash matching a hash calculated for the first data block is not found in CBRC hash table 122), then at 230, the content of the first data block is checked against DD cache 112 to determine whether DD cache 112 maintains identical content. The calculated hash for this first data block is compared to hashes previously stored in DD cache hash table 132. Hashes previously stored in DD cache hash table 132 are indexes to dedup counter(s)

134 stored in DD cache 112, such that there is a mapping between a hash generated for the first data block and a dedup counter 134 corresponding to the first data block if the first data block content is stored in DD cache 112.

A hash for this first data block content may exist in DD cache 112 if the first data block content was previously stored in CBRC 110, had a dedup count above its defined threshold, and was previously evicted from CBRC 110. Evicted data block content from CBRC 110 with a dedup count above its defined threshold may be moved to DD cache 112 to increase the cache hit ratio in scenarios where the same data block content is requested in an I/O request after CBRC's LRU policy has evicted the data block content as the least recently accessed object.

In the case where the hash corresponding to the first data block is matched against another hash in DD cache hash table 132, at 232, the data block content related to the hash stored in DD cache 112 may be cached in LRU cache 128. In other words, the data block content stored in DD cache 112 may be moved back to CBRC 110 at the top of its LRU list in LRU cache 128 indicating that this data block content has been accessed most recently compared to other data block content in the list. Migration of this data block content to CBRC 110 may remove this data block content from DD cache 112. Metadata related to this data block content, including its corresponding hash and memory location, may be moved to CBRC hash table 122 and CBRC lookup table 126, respectively, and removed from DD cache hash table 132 and DD cache lookup table 136, respectively.

At 234, dedup count of the data block content may be restored in dedup counter 124 of CBRC 110 by maintaining the dedup count of dedup counter 134 of DD cache 112 related is this data block content to preserve duplication information associated with this data block content. At 236, the dedup counter 124 may be incremented to account for this I/O write request. As described at 224, the incrementing depends on whether the write is a new or an overwrite, and whether an overwrite is for new content or the same content as the old content being overwritten.

In the case where the hash corresponding to the first data block is not matched against another hash stored in DD cache hash table 132, at 238, the first data block content related to the hash may be cached in LRU cache 128 at the top of its LRU list. At 240, a dedup counter 124 in CBRC 110 may be created and initialized (e.g., with dedup count=1) for the cached first data block content to maintain a record of the number of times a write request is issued, by a VM 103 or among VMs 103, for the same content of data, where each write request corresponds to a unique I/O for a LBA. The dedup counter 124 may be incremented up to n times, where n is an integer greater than zero. A threshold may also be defined for dedup counter 124. The first data block content's hash may be stored in CBRC hash table 122 along with its dedup counter 124 (e.g., in a tuple of <hash of first data block, dedup counter>). Additionally, the first data block content's hash may be stored in CBRC lookup table 126 along with a memory location of the first block of data (e.g., in a tuple of <hash of first block of data, memory location of the first block of data in CBRC>).

When new data block content is cached in CBRC 110, whether it be new content written to the virtual disk or content migrated from DD cache 110 back into CBRC 110, hardware platform 106 implements CBRC 110 in memory 108 for temporary storage of data likely to be used again, and in doing so, grants CBRC 110 a memory budget. In some cases, a memory budget may be shared between CBRC 110 and DD cache 112. CBRC 110 may be required to remain within its memory budget. For this reason, memory usage may be regulated. If CBRC 110 is not full (e.g., memory usage is within its allocated memory budget), no further steps are necessary to service the write request. However at 242, if CBRC 110 is full (e.g., memory usage is at capacity compared to its allocated memory budget) due to the addition of the first data block content cached in CBRC 110, then at 244, CBRC's LRU policy assesses which data block content in CBRC 110 may be removed. CBRC 110 may consult its LRU list in LRU cache 128 in making this determination.

LRU data block content of CBRC 110 may be evicted from CBRC 110 or may be evicted from CBRC 110 and moved to DD cache 112. The correct course of eviction may be determined based on whether the LRU data block content was previously linked to DD cache 112 (e.g., whether DD cache 112 points to this data block content). DD cache 112 may point to data block content having a dedup count higher than its defined threshold.

If DD cache 112 points to the LRU data block content, at 246, the LRU data block content may be evicted from CBRC 110 and, at 248, cached in DD cache 112. In other words, the LRU data block content stored in CBRC 110 may be moved to DD cache 112. In some cases, moving or migrating the content may simply include removing a pointer to the content in the CBRC 110 and maintaining a pointer to the content in DD cache 112. Migration of this LRU data block content may also, at 250, preserve dedup count of the LRU data block content from dedup counter 124 in CBRC 110 in the dedup counter 134 in DD cache 112. Evicted LRU data block content may be maintained in DD cache 112 in an order that takes into consideration dedup count of the stored content in DD cache 112. For example, the evicted LRU data block content may be maintained in DD cache 112 in descending order of deduplication count. Metadata related to this evicted LRU data block content, including its corresponding hash and memory location, may be stored in DD cache hash table 132 and DD cache lookup table 136, respectively, and removed from CBRC hash table 122 and CBRC lookup table 126, respectively.

If DD cache 112 does not point to the LRU data block content, then at 252, the LRU data block content may be evicted from CBRC 110. Metadata related to this LRU data block content, including its corresponding hash, dedup counter, and memory location, may be removed from CBRC hash table 122 and CBRC lookup table 126, respectively. In some cases, data may similarly be evicted from DD cache 112 as needed, such as when a dedup counter associated with the data goes below a threshold. In some cases, the threshold may change, such as if a size limit is reached for the DD cache 112, and the threshold is increased to evict less deduplicated data.

Figure 3:
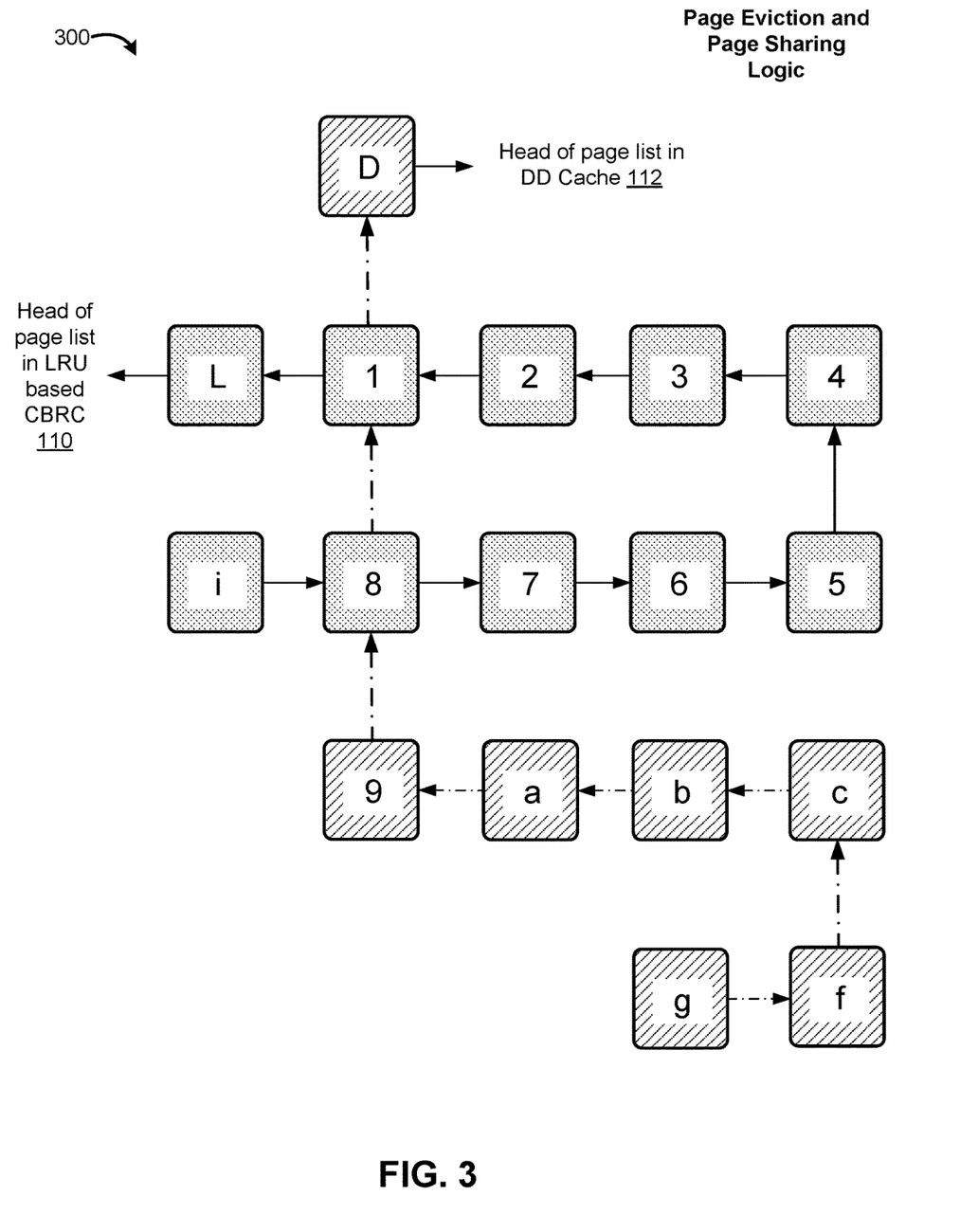
FIG. 3 depicts example eviction and data block content sharing logic when using a caching policy in accordance with embodiments of the present disclosure.

FIG. 3 depicts example eviction and data block content sharing logic 300 when using a caching policy in accordance with embodiments of the present disclosure. As shown in FIG. 3, an LRU policy in CBRC 110 may be supplemented by a DD policy in DD cache 112. The memory footprint in RAM may be shared between CBRC 110 and DD cache 112, for example, only data block content stored in one cache counts towards allocated capacity of the caching system.

Data block content in CBRC 110 may be stored and evicted according to an LRU policy. As described above, an LRU policy exploits the temporal locality of data stored in CBRC 110 by defining a policy that organizes data block content in order of use/access. Data block contents of CBRC 110 may be organized in a list where the item at the top of the list comprises content that has recently been accessed to serve an I/O from one of VMs 103 accessing the cache. The item at the bottom of the list may comprise content that has been least recently accessed. As shown in the example of FIG. 3, the head of the LRU list in CBRC 110 may be data block content "L" when "L" was the most recently accessed content in CBRC 110. The end of the LRU list may include data block content "i". Data block content "i" may be the least recently accessed content in CBRC 110 and may be most at risk of being evicted from CBRC 110.

Data block content in DD cache 112 may be stored and evicted according to a DD policy. A DD policy of DD cache 112 organizes data in DI) cache 112 according to a dedup count of their dedup counter. DD cache 112 maintains data block content in descending order of dedup count in DD cache 112. As shown in the example of FIG. 3, the head of the DD list in DD cache 112 may be data block content "D" when content "D" comprises the highest dedup count in DD cache 112. The end of the DD list may include data block content "g". Data block content "g" may be data block content in DD cache 112 with the lowest dedup count and may be most at risk of being evicted from DD cache 112.

Data block content "1" and data block content "8" may be shared between both CBRC 110 and DD cache 112. As described previously, when incrementing dedup counter 124 in CBRC 110 for data block content causes dedup counter 124 to reach a defined threshold amount, the data block content associated with this dedup counter 124 may be linked to DD cache 112. In other words, at this point, DD cache 112 may point to this data block content in CBRC 110. If at a later time this data block content is removed from CBRC 110, this data block content may be maintained in DD cache 112. For example, as shown in FIG. 3, data block content "D" may not be part of CBRC 110 due to eviction from CBRC 110; however, data block content "D" may still be read and hence maintained in DD cache 112. Count of dedup counter 124 may be preserved in dedup counter 134 when data block content "D" is evicted from CBRC 110. Additionally, memory location of data block content "D" may be maintained in DD cache lookup table 136 in a tuple of <hash of data block content "D", memory location of data block content "D">.

Data block content "D" may continue to be served from the cache during a subsequent read or write request without the need for retrieving this data from the virtual disk. When an I/O requests read or write of data block content "D", data block content "D" may be moved from DD cache 112 back to the top of the LRU list in LRU cache 128. The dedup count of dedup counter 134 may be maintained in the move back to dedup counter 124 of CBRC 110. Dedup counter 124 of data block content "D" may continue to be incremented/decremented in CBRC 110 according to techniques described herein.

In some embodiments. DD cache 112 has space limitations and may evict data block content from DD cache 112 if it is not shared between the list in CBRC 110 and the DD list in DD cache 112.

Figure 4:
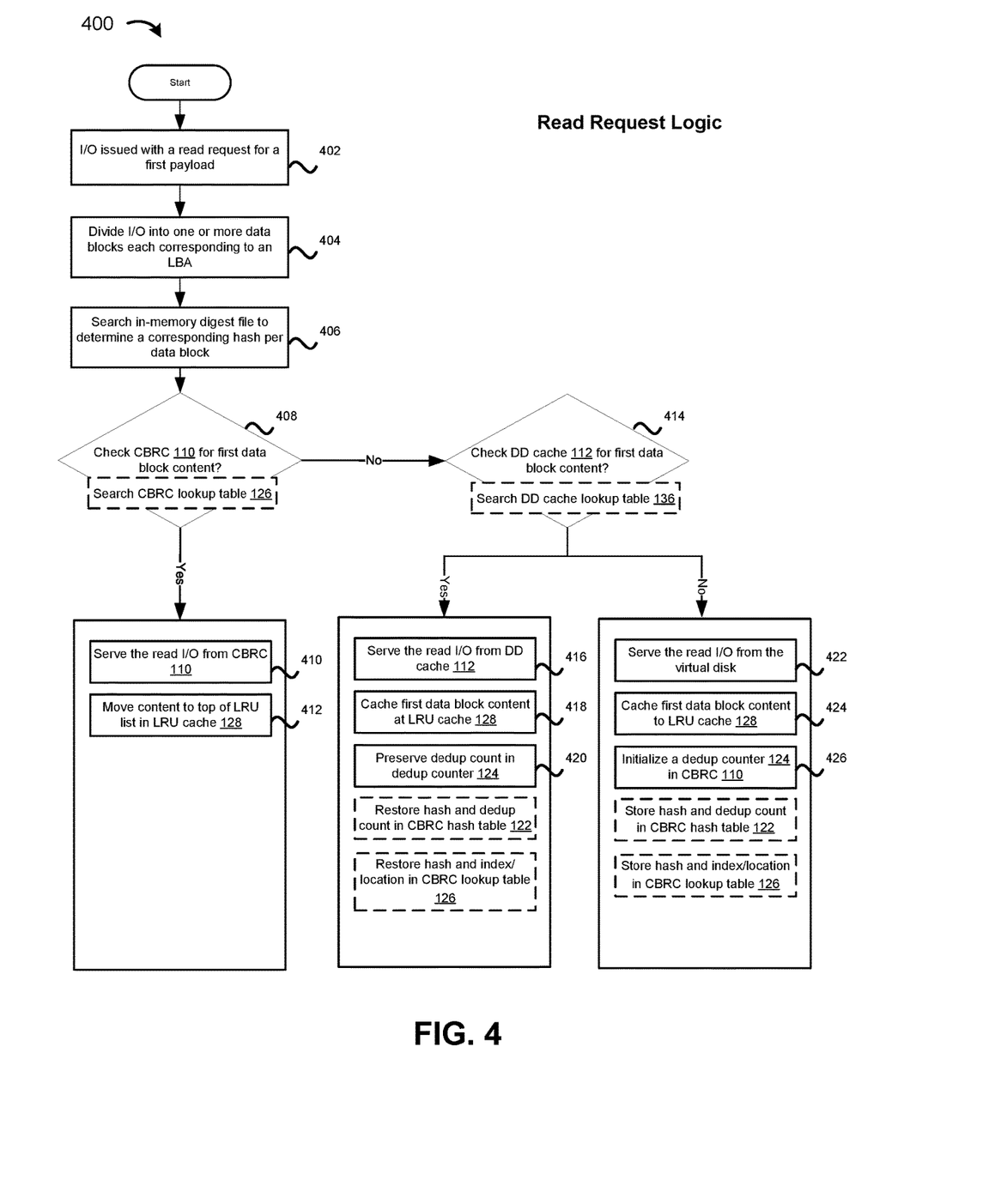
FIG. 4 depicts an example workflow for processing a read request according to a DD assisted caching policy in accordance with embodiments of the present disclosure.

FIG. 4 depicts an example workflow 400 for processing a read request according to a DD assisted caching policy, in accordance with embodiments of the present disclosure. The workflow 400 of FIG. 4 may begin, at 402, by a VM 103 in host 102 issuing an I/O with a read request for a first payload. At 404, the first payload may be divided into blocks of data, each block of data corresponding to the size of a physical block of storage. Each block of data may be referenced by an LBA. While steps 406-426 of workflow 400 are described with respect to a single first block of data, where the payload is divided into multiple data blocks, each block may be handled separately (through steps 406-426 of workflow 400) in servicing the read request.

At 406, an in-memory copy of the digest file 138, which stores tuples of <LBA, hash of content of data referenced by the LBA, validity bit>where LBA is the key, may be used to retrieve a corresponding hash for the requested first block of data referenced by the first LBA. At 408, the corresponding hash may be used to find a memory location of the data block content in CBRC 110 using CBRC lookup table 126, which stores tuples of tuples of <hash of a block of data, memory location of the block of data in CBRC>, where the hash is the key.

If a matching hash is found in CBRC lookup table 126, then at 410, the first data block content corresponding to the hash is located according to its memory location and retrieved from CBRC LRU cache 128 to serve the read request. At 412, this content may be moved to the top of the LRU list in CBRC LRU cache 128 indicating that this content has been accessed most recently compared to other content in the list.

If a matching hash for the requested data block content is not found in CBRC lookup table 126, then at 414, the hash for the requested data block content may be may be used to find a location of the data block content in DD cache 112 using DD cache lookup table 136, which stores tuples of tuples of <hash of a block of data, memory location of the block of data in DD cache>, where the hash is the key.

If a matching hash for the requested data is found in DD cache lookup table 136, then at 416, the first data block content corresponding to the hash is located according to its memory location and retrieved from DD cache 112 to serve the read request. At 418, the data block content related to this hash stored in DD cache 112 may be cached in CBRC LRU cache 128. The data block content stored in DD cache 112 may be moved back to CBRC 110 at the top of its LRU list in LRU cache 128 indicating that this data block content has been accessed most recently compared to other data block content in the list. Metadata related to this data block content, including its corresponding hash and memory location, may be moved to CBRC hash table 122 and CBRC lookup table 126, respectively, and removed from DD cache hash table 132 and DD cache lookup table 136, respectively.

At 420, dedup count of the data block content may be restored in dedup counter 124 of CBRC 110 by maintaining the dedup count of dedup counter 134 of DD cache 112 to preserve data related to this content's duplication.

If a matching hash for the requested data is not found in DD cache lookup table 136, then at 422, the first data block content corresponding to the hash is retrieved from the virtual disk. At 424, the first data block content related to the hash may be cached in CBRC LRU cache 128 at the top of its LRU list for future read or write I/Os. At 426, a dedup counter 124 in CBRC 110 may be created and initialized (e.g., with dedup count=1) for the cached content to maintain a record of the number of times a write request is issued for the same content of data, where each write request corresponds to a unique I/O for the data (e.g., for a VM 103 or among VMs 103 accessing CBRC 110). The first data block content's hash may be stored in CBRC hash table 122 along with its dedup counter 124 (e.g., in a tuple of <hash of first data block, dedup counter>). The first data block content's hash may be stored in CBRC lookup table 126 along with a memory location of the first block of data (e.g., in a tuple of <hash of first block of data, memory location of the first block of data in CBRC>).

Aspects of the present disclosure may provide a significant benefit to virtual desktop environments (VDIs) experiencing boot storms. A VDI boot storm is the degradation of service that occurs when a significant number of virtual endpoints boot up within a narrow time frame and overwhelm the network with data requests. Boot files of each of the VMs may be the same, thus, aspects described herein may help to ensure data block content accessed by VMs is not evicted from the cache. These additional or assisting caching policies may be introduced in the VDI environment to improve the cache hit ratio and service of I/Os thereby improving overall effectiveness of the caching system.

Aspects of the present disclosure may also provide a significant benefit to instant clone environments. An instant clone environment includes instant clones that share a virtual disk of a parent VM and therefore consume less storage than full VMs. In addition, instant clones share the memory of the parent VM. Cloned VMs may be running similar applications as other cloned VMs and the parent VM and issue write or read requests for similar content. Introduction of a dedup counter may take this into consideration and maintain a record of deduplication. In this environment, the dedup counter may be incremented regularly and ensure highly deduplicated data does not get evicted from the cache. Accordingly, a cache hit ratio of the cache may be improved.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for caching data in a virtualized computing system, comprising:
  receiving a first input/output (I/O) to write first data in storage as associated with a first logical block address (LBA);
  when the first data is located in a content based read cache (CBRC) or in a deduplication (DD) cache located in memory, incrementing a first deduplication counter associated with the first data;
  when the first data is located in neither the CBRC nor the DD cache, creating the first deduplication counter;
  when the first deduplication counter meets a threshold after incrementing, and the first data is not located in the DD cache, adding the first data to the DD cache; and
  writing the first data to the storage as associated with the first LBA.

2. The method of claim 1, wherein prior to receiving the first I/O the storage stores second data as associated with the first LBA, and at least one of the CBRC or the DD cache stores the second data, and further comprising, based on receiving the first I/O, decrementing a second deduplication counter associated with the second data.

3. The method of claim 2, wherein incrementing the first deduplication counter and decrementing the second deduplication counter are based on determining the first data is different than the second data.

4. The method of claim 1, wherein adding the first data to the DD cache comprises creating a pointer in the DD cache pointing to the first data cached in the CBRC.

5. The method of claim 4, further comprising:
  evicting the first data from the CBRC in accordance with a least recently used (LRU) policy of the CBRC; and
  based on the pointer in the DD cache:
    moving metadata associated with the first data to the DD cache; and
    removing the metadata associated with the first data from the CBRC.

6. The method of claim 5, wherein the metadata associated with the first data comprises a hash of the first data and the first deduplication counter.

7. The method of claim 1, further comprising, when the first data is located in the DD cache and not the CBRC, and when a new I/O is received associated with the first data:
  moving metadata associated with the first data to the CBRC; and
  removing the metadata associated with the first data from the DD cache.

8. The method of claim 1, further comprising, based on receiving the first I/O:
  generating a hash of the first data;
  checking a CBRC table for the hash to determine whether the first data is located in the CBRC; and
  when the hash is not in the CBRC table, checking a DD cache table for the hash to determine whether the first data is located in the DD cache.

9. The method of claim 1, further comprising:
  receiving a second I/O to read second data associated with a second LBA;
  retrieving a hash of the second data from a mapping that maps LBAs to hashes of data associated with the LBAs;
  when the hash is located in the CBRC, retrieving the second data from the CBRC;
  when the hash is located in the DD cache and not the CBRC:
    moving metadata associated with the second data to the CBRC;
    removing the metadata associated with the second data from the DD cache; and
    retrieving the second data from the DD cache; and
  when the hash is located in neither the CBRC nor the DD cache, retrieving the second data from the storage.

10. A non-transitory computer readable medium comprising instructions that, when executed by one or more processors of a computing system, cause the computing system to perform a method for caching data in a virtualized computing system, the method comprising:
  receiving a first input/output (I/O) to write first data in storage as associated with a first logical block address (LBA);
  when the first data is located in a content based read cache (CBRC) or in a deduplication (DD) cache located in memory, incrementing a first deduplication counter associated with the first data;
  when the first data is located in neither the CBRC nor the DD cache, creating the first deduplication counter;
  when the first deduplication counter meets a threshold after incrementing, and the first data is not located in the DD cache, adding the first data to the DD cache; and
  writing the first data to the storage as associated with the first LBA.

11. The non-transitory computer readable medium of claim 10, wherein prior to receiving the first I/O the storage stores second data as associated with the first LBA, and at least one of the CBRC or the DD cache stores the second data, and wherein the method further comprises, based on receiving the first I/O, decrementing a second deduplication counter associated with the second data.

12. The non-transitory computer readable medium of claim 11, wherein incrementing the first deduplication counter and decrementing the second deduplication counter are based on determining the first data is different than the second data.

13. The non-transitory computer readable medium of claim 10, wherein adding the first data to the DD cache comprises creating a pointer in the DD cache pointing to the first data cached in the CBRC.

14. The non-transitory computer readable medium of claim 13, wherein the method further comprises:
  evicting the first data from the CBRC in accordance with a least recently used (LRU) policy of the CBRC; and
  based on the pointer in the DD cache:
    moving metadata associated with the first data to the DD cache; and
    removing the metadata associated with the first data from the CBRC.

15. The non-transitory computer readable medium of claim 14, wherein the metadata associated with the first data comprises a hash of the first data and the first deduplication counter.

16. The non-transitory computer readable medium of claim 10, wherein the method further comprises, when the first data is located in the DD cache and not the CBRC, and when a new I/O is received associated with the first data:
  moving metadata associated with the first data to the CBRC; and
  removing the metadata associated with the first data from the DD cache.

17. The non-transitory computer readable medium of claim 10, wherein the method further comprises, based on receiving the first I/O:
  generating a hash of the first data;
  checking a CBRC table for the hash to determine whether the first data is located in the CBRC; and
  when the hash is not in the CBRC table, checking a DD cache table for the hash to determine whether the first data is located in the DD cache.

18. The non-transitory computer readable medium of claim 10, wherein the method further comprises:
  receiving a second I/O to read second data associated with a second LBA;
  retrieving a hash of the second data from a mapping that maps LBAs to hashes of data associated with the LBAs;
  when the hash is located in the CBRC, retrieving the second data from the CBRC;
  when the hash is located in the DD cache and not the CBRC:
    moving metadata associated with the second data to the CBRC;
    removing the metadata associated with the second data from the DD cache; and
    retrieving the second data from the DD cache; and
  when the hash is located in neither the CBRC nor the DD cache, retrieving the second data from the storage.

19. A system comprising one or more processors and a non-transitory computer readable medium comprising instructions that, when executed by the one or more processors, cause the system to perform a method for caching data in a virtualized computing system, the method comprising:
  receiving a first input/output (I/O) to write first data in storage as associated with a first logical block address (LBA);
  when the first data is located in a content based read cache (CBRC) or in a deduplication (DD) cache located in memory, incrementing a first deduplication counter associated with the first data;
  when the first data is located in neither the CBRC nor the DD cache, creating the first deduplication counter;
  when the first deduplication counter meets a threshold after incrementing, and the first data is not located in the DD cache, adding the first data to the DD cache; and
  writing the first data to the storage as associated with the first LBA.

20. The system of claim 19, wherein prior to receiving the first I/O the storage stores second data as associated with the first LBA, and at least one of the CBRC or the DD cache stores the second data, and wherein the method further comprises, based on receiving the first I/O, decrementing a second deduplication counter associated with the second data.

* * * * *